United States Patent
Paul et al.

(10) Patent No.: US 10,489,702 B2
(45) Date of Patent: Nov. 26, 2019

(54) HYBRID COMPRESSION SCHEME FOR EFFICIENT STORAGE OF SYNAPTIC WEIGHTS IN HARDWARE NEUROMORPHIC CORES

(71) Applicant: Intel Corporation, Santa Clara, CA (US)

(72) Inventors: Somnath Paul, Hillboro, OR (US); Charles Augustine, Portland, OR (US); Muhammad M. Khellah, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 421 days.

(21) Appl. No.: 15/370,542

(22) Filed: Dec. 6, 2016

(65) Prior Publication Data

US 2018/0107919 A1    Apr. 19, 2018

Related U.S. Application Data

(60) Provisional application No. 62/408,534, filed on Oct. 14, 2016.

(51) Int. Cl.
| | | |
|---|---|---|
| *G06N 3/00* | (2006.01) | |
| *G06N 3/04* | (2006.01) | |
| *G06N 3/08* | (2006.01) | |
| *G06N 3/063* | (2006.01) | |

(52) U.S. Cl.
CPC ............. *G06N 3/04* (2013.01); *G06N 3/049* (2013.01); *G06N 3/063* (2013.01); *G06N 3/08* (2013.01)

(58) Field of Classification Search
CPC ....................................................... G06N 3/04

USPC ............................................................ 706/22
See application file for complete search history.

(56) References Cited

U.S. PATENT DOCUMENTS

| | | | |
|---|---|---|---|
| 7,277,585 B2 * | 10/2007 | Yagishita | .............. H04N 1/32 358/426.07 |
| 2010/0312735 A1 * | 12/2010 | Knoblauch | .......... G06N 3/0445 706/25 |
| 2013/0073484 A1 | 3/2013 | Izhikevich et al. | |
| 2015/0046382 A1 | 2/2015 | Rangan | |

OTHER PUBLICATIONS

Yu et al. "Compression of FPGA Bitstreams Using a Novel Bitmask and RLE Algorithm", Feb. 7, 2015, Proceedings of Ninth TheIIER International Conference, pp. 17-22. (Year: 2015).*
Jan Koutnik et al., "Evolving Neural Networks in Compressed Weight Space," GECCO'10, Jul. 7-11, 2010, 7 pages.
Giacomo Indiveri, "Memory and Information Processing in Neuromorphic Systems," IEEE, vol. 103, No. 8, pp. 1-16, Aug. 2015.
Xiaoxiao Liu et al., "RENO: A High-efficient Reconfigurable Neuromorphic Computing Accelerator Design," Design Automation Conference (DAC), Jun. 8-12, 2015, 6 pages.
International Preliminary Report on Patentability for PCT/US2017/055755 dated Apr. 25, 2019, 6 pages.

* cited by examiner

*Primary Examiner* — Hien D Khuu
(74) *Attorney, Agent, or Firm* — Jordan IP Law, LLC

(57) ABSTRACT

Systems, apparatuses and methods may provide a hybrid compression scheme to store synaptic weights in neuromorphic cores. The hybrid compression scheme utilizes a run-length encoding (RLE) compression approach, a dictionary-based encode compression scheme, and a compressionless encoding scheme to store the weights for valid synaptic connections in a synaptic weight memory.

24 Claims, 7 Drawing Sheets

HYBRID COMPRESSION SCHEME FOR EFFICIENT STORAGE OF SYNAPTIC WEIGHTS IN HARDWARE NEUROMORPHIC CORES

CROSS-REFERENCE TO RELATED APPLICATIONS

The present application claims priority to U.S. Provisional Patent Application No. 62/408,534 filed Oct. 14, 2016.

BACKGROUND

Technical Field

Embodiments generally relate to a hybrid compression scheme to store synaptic weights in neuromorphic cores.

Discussion

Neuromorphic machines or hardware with spiking neural networks may have shown a high level of energy efficiency when processing real world stimuli, such as in image recognition systems and speech recognition systems. Neuromorphic systems are electronic instantiations of biological nervous systems, which mimic the behavioral and structural aspects of real neural networks. The three main components of neuromorphic systems are neurons (representing processors), synapses (the connection between two neurons), and a learning rule. The neurons have multiple synapses, which convey signals between the neurons. Learning in neuromorphic systems may be realized by adapting the synaptic strength (or synaptic weight) between neurons.

The neuromorphic hardware may typically consist of multiple neuro-synaptic cores that require a large memory capacity. In the neuromorphic cores, the synaptic memory may be used to store multi-bit weights for synaptic connections, and thus requires a large memory capacity. Therefore, a challenge occurs when the weights of the synapses have to be stored in architectures having limited memory capacity.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION OF EXEMPLARY EMBODIMENTS

Figure 1:
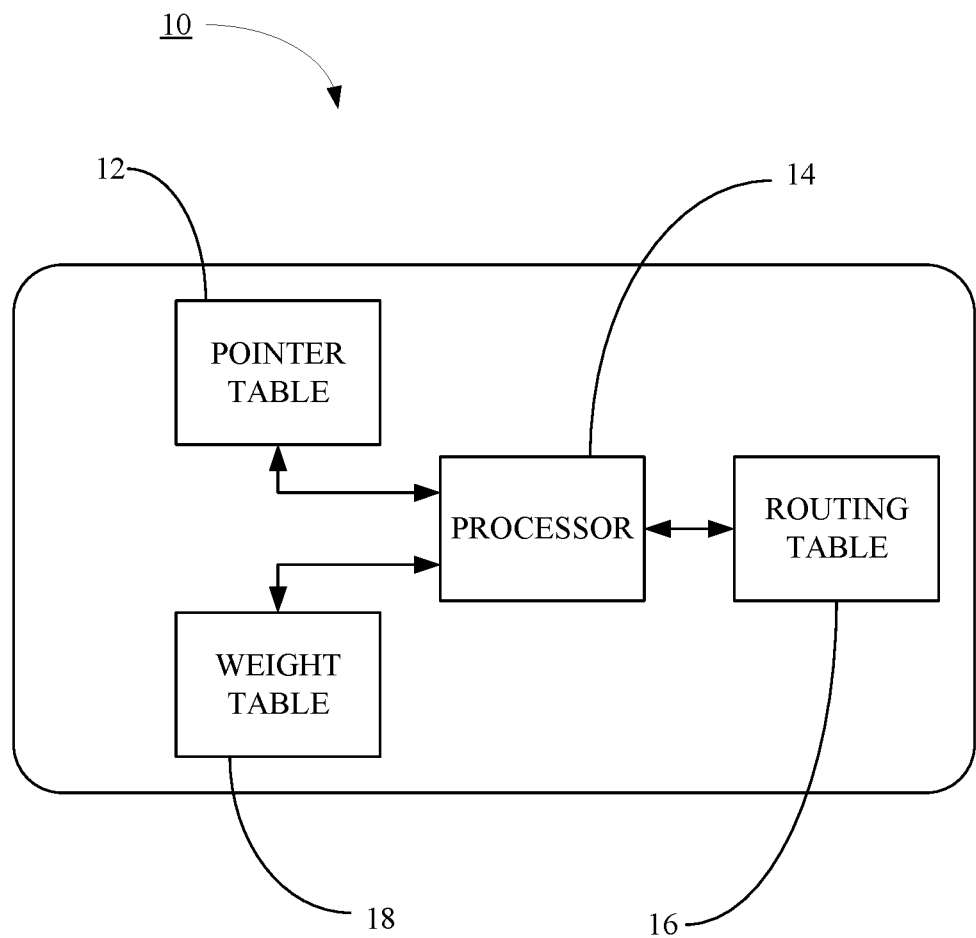
FIG. 1 is an illustration of a neuromorphic core according to an embodiment.

Turning now to FIG. 1, a neuromorphic core 10 is illustrated. The neuromorphic core 10 may include a pointer table 12 (e.g., stored in memory), a processor 14, a routing table 16, and a weight table 18 (e.g., stored in memory). The pointer table 12 may contain a pointer for each core input to indicate its starting position in the weight table 18. Specifically, the pointer table 12 may store the range of addresses in the weight table 18 that correspond to fan-out weights for a given pre-synaptic neuron. The routing table 16 may store destination addresses of newly generated synaptic spikes.

Figure 2:
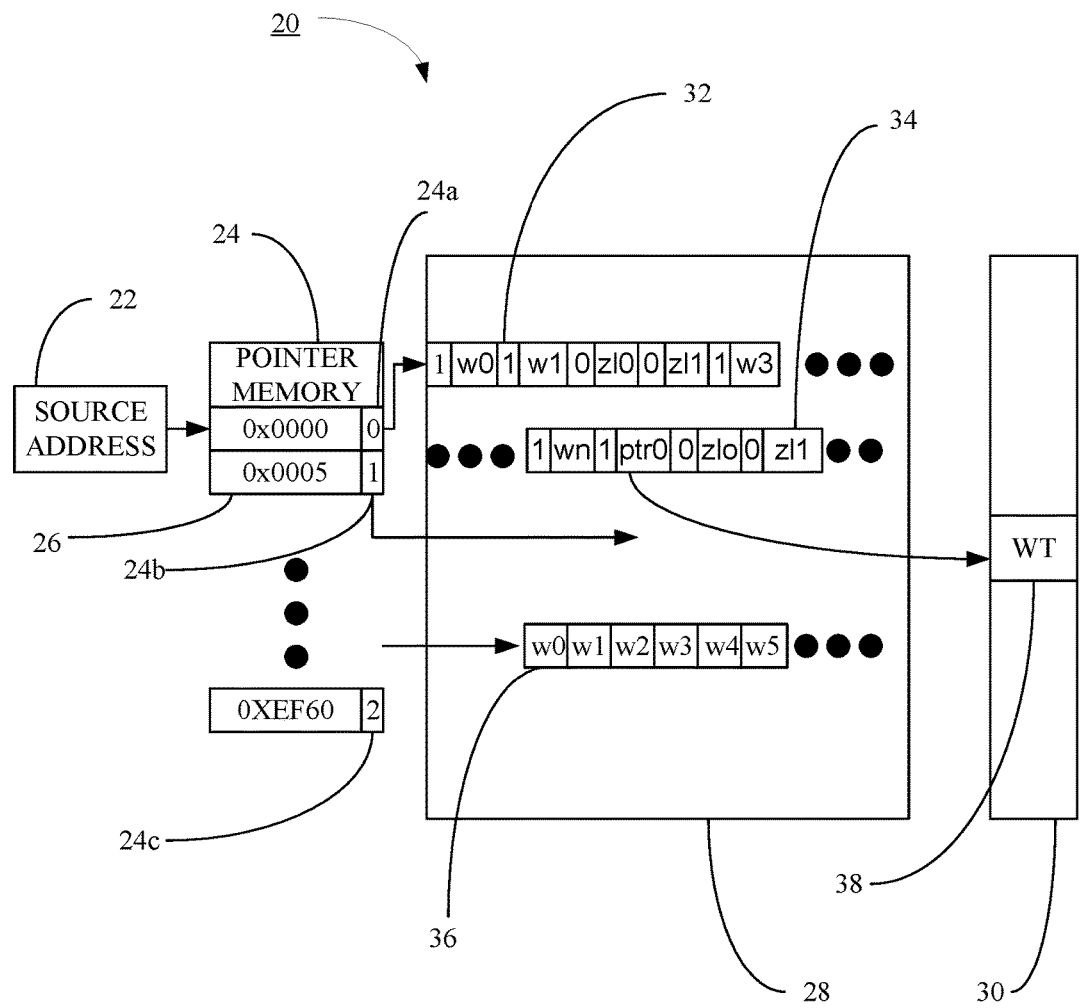
FIG. 2 is an illustration of a compression scheme according to an embodiment.

Turning now to FIG. 2, the neuromorphic hardware organization 20 of the synaptic storage is illustrated. The neuromorphic hardware organization 20 includes a source address (or Address Event Representation/AER)) 22, a pointer memory 24, a synaptic weight memory 28, and a dictionary memory 30. The pointer memory 24 may include entries 26 that correspond to the starting addresses of the synaptic weights of pre-synaptic neurons 32, 34 in the weight memory 28. The pointer memory 24 may also include bit identifiers 24a, 24b, 24c that are added to each individual address entry 26 to indicate a type of compression scheme used for each pre-synaptic neuron 32, 34.

The embodiment in FIG. 2 illustrates an efficient way of compressing the synaptic weight memory using a hybrid compression scheme that includes a run length encoding (RLE) compression scheme and a dictionary encode compression scheme. The pre-synaptic neuron 32 includes fan-out weights. As illustrated in FIG. 2, the first fan-out weight may have a valued weight or a non-zero weight "w0". The non-zero weight "w0" may be stored in the weight memory by providing one bit "1" immediately before the non-zero weight "w0". The "1" indicates that the entry that immediately follows the single bit "1" is a non-zero weight.

The subsequent fan-out weight, "w1", may also have a non-zero value. Accordingly, the single bit immediately preceding "w1" is "1", indicating that the fan-out weight "w1" has a non-zero value.

If the subsequent set of synaptic connections have a string of zero weights, this may be identified by a "0" to indicate that the following set of synaptic connections has a zero weight value. Additionally, the number of zeros in the string may be defined as "zl0", indicating the length or number of zeros in the string, where "z" is the number of zeros in the string.

The length of zeros may be represented within a set bitwidth. Accordingly, if a contiguous set of zeros cannot fit into a set bitwidth, the set of zeros would be divided into separate sets, for example, "zl0" and "zl1". Accordingly, the non-zero values (w0, w1, and w3) are stored with runs of zeros (zl0 and zl1).

Additionally, in the pointer memory 24, bit identifier "0" (24a) identifies that RLE compression scheme will be performed on the pre-synaptic neuron 32.

The second technique for compressing the synaptic weight memory 28 determines commonly occurring non-zero synaptic weights that are within a predetermined weight value of each other, or non-zero synaptic weights that have substantially similar weights. In that case, weights that are close to each other in value are treated as being the same, or a single weight, without causing system degradation, such as losses in recognition accuracy. These sets of weights (WT), close to each other in value, are placed in the dictionary 30. The dictionary 30 may be a look-up table (LUT), but is not limited thereto.

A pointer (for example, "ptr0") in the weight memory 28 may point to a location 38 in the dictionary 30 where the sets of weights (WT), close to each other in value, are stored. Since these weights are not stored in the weight memory 28, the number of bits used for storing information in the weight memory 28 is reduced, thus making the weight memory 28 more compact in size. Bit identifier "1" in the pointer memory 24 indicates a dictionary encode compression will be performed on the presynaptic neurons 32, 34.

Bit identifier "2" (24c) in the pointer memory 24 indicates a no-compression (or compressionless) scheme. The compressionless scheme may store non-zero synaptic weights based on the bit identifier "2" being detected in the pointer memory. The compressionless scheme may be utilized in cases where specific neurons fan-out to all other neurons, for example, the global or common connection of one neuron to other neurons. The fan-out weights for these types of neurons may be stored contiguously without additional bits indicating the weights are zeros or non-zeros.

Figure 3:
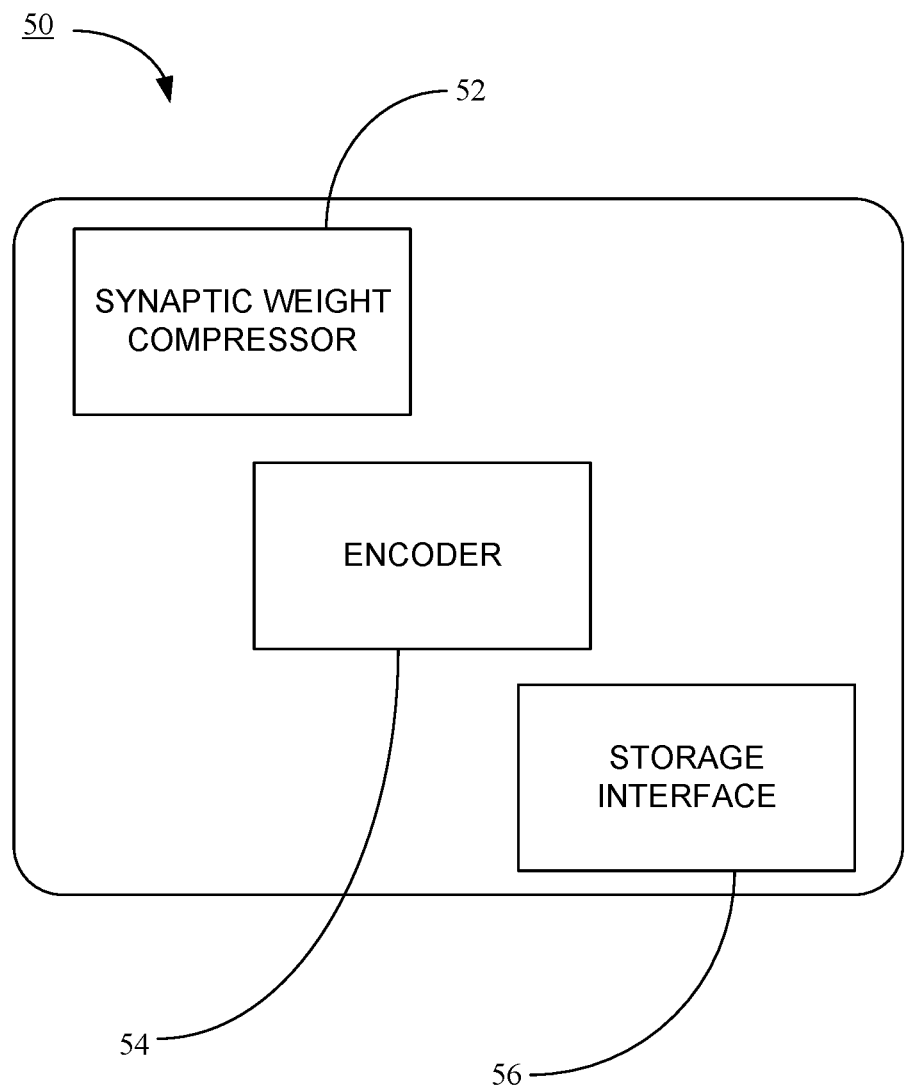
FIG. 3 is an illustration of a neuromorphic apparatus according to an embodiment.

Turning now to FIG. 3, a neuromorphic apparatus 50 according to an embodiment is illustrated. In the illustrated example, the weights of synaptic connections between N-neurons are analyzed, and the weights are mapped unto the weight memory 28 (FIG. 2). The apparatus 50 includes a weight compressor 52, which performs a RLE compression on the synaptic weights stored in the weight memory 28 (FIG. 2) based on a first prefix bit (for example, 24a, FIG. 2) of a plurality of prefix bits. As previously discussed, a prefix bit such as "0" indicates that a pre-synaptic neuron includes valued weight and non-zero value weights, and thus RLE compression should be performed on the pre-synaptic neuron. RLE compression is then performed on the pre-synaptic neuron as previously discussed.

If a determination is made that specific synaptic weights are within a predetermined weight value of each other based on a second prefix bit, for example, "1" (24b, FIG. 2) of the plurality of prefix bits, an encoder 54, communicatively coupled to the weight compressor 52, may conduct a dictionary-based encode of the commonly occurring synaptic weights that are within a predetermined weight value of each other based on the prefix bit (for example, "1") of the plurality of prefix bits.

On the other hand, if a determination is made that there would be no substantially benefits from performing compression of the pre-synaptic neurons, or if a determination is made during the RLE compression that common neurons that have non-zero weights are being processed, a storage interface 56 conducts a compressionless storage of the non-zero synaptic weights without overhead or additional bits indicating that the weights are zeros or non-zeros.

Figure 4:
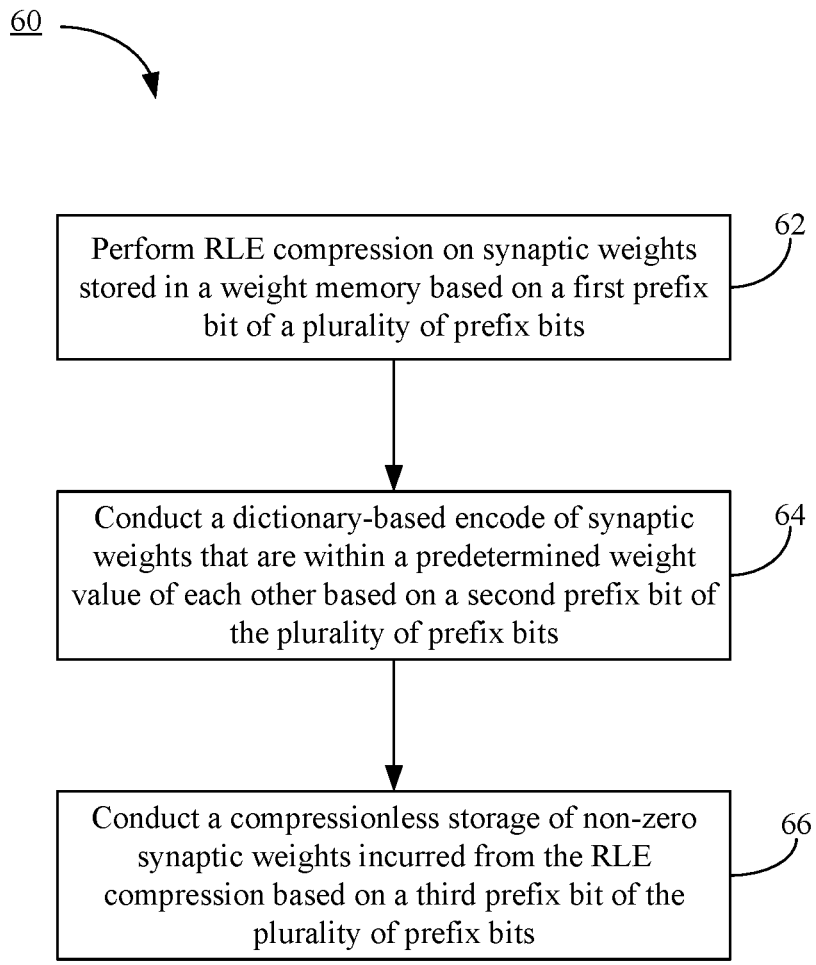
FIG. 4 illustrates a flowchart of a hybrid compression method of storing synaptic weights according to an embodiment.
Figure 5A:
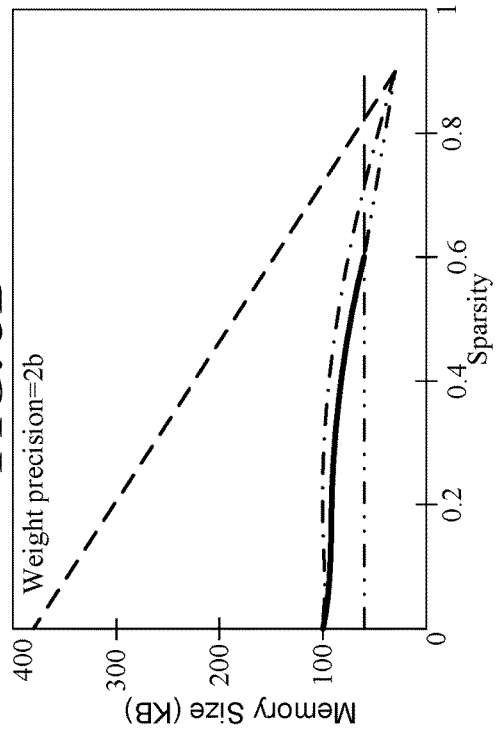
FIGS. 5A-5D illustrate comparisons of related art compression approaches to the hybrid compression scheme of an exemplary embodiment.
Figure 5B:
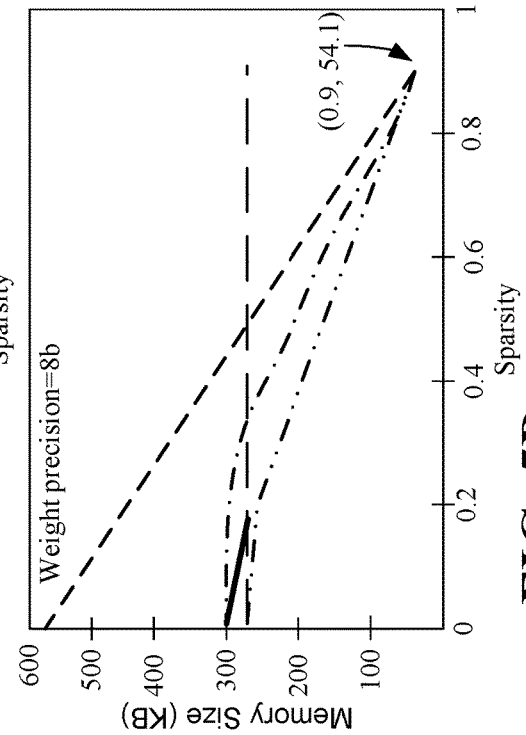
Figure 5C:
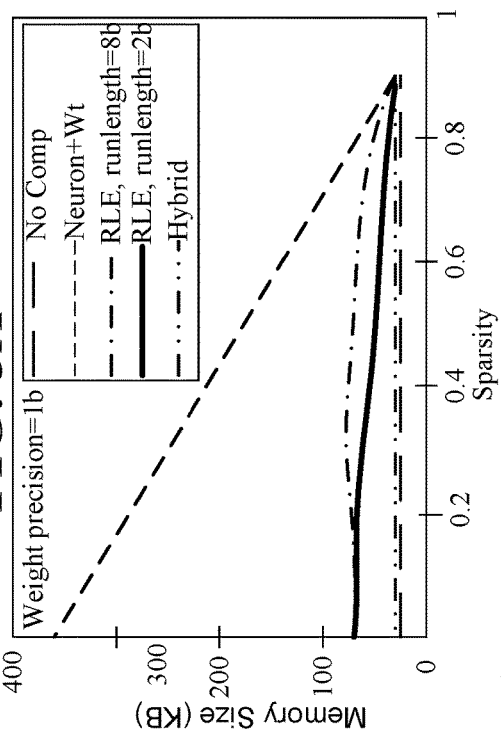
Figure 5D:
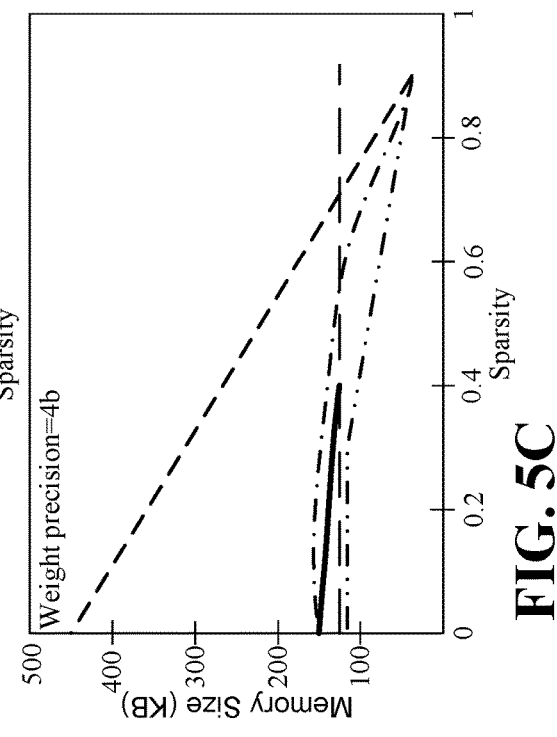

FIG. 4 shows a method 60 of compressing synaptic weights in a synaptic weight memory according to an embodiment. The method 60 may generally be implemented in a compression-enabled memory apparatus as described herein. More particularly, the method 60 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 may provide for performing a RLE compression on a set of synaptic weights stored in a weight memory 28 (FIG. 2) based on a first prefix bit of a plurality of prefix bits. As synaptic weights are mapped onto the weight memory 28 (FIG. 2), a determination is made with regard to which synaptic weights of the set of synaptic weights have a zero value, and which synaptic weights of the set of synaptic weights have a non-zero value. If a determination is made that the synaptic weights of a pre-synaptic neuron have zero values and non-zero values, a RLE compression scheme may be performed on the pre-synaptic neuron.

As illustrated in processing block 64, if a determination is made that specific commonly occurring synaptic weights are within a predetermined weight value of each other based on a second prefix bit of the plurality of prefix bits, a dictionary-based encode may be performed on the commonly occurring synaptic bits. In this case, synaptic weights that are close to each other in value are treated as being the same weight, or a single weight. These sets of weights (WT), close to each other in value, are placed in the dictionary 30 (FIG. 2).

In processing block 66, a determination may be made whether there would be no benefit from performing compression of the pre-synaptic neurons, or if specific neurons fan-out to all other neurons, and therefore have a common connection. The fan-out weights for these types of neurons may be stored contiguously without additional bits indicating the weights are zeros or non-zeros, thus improving the compactness in size of the memory 28 (FIG. 2).

It is to be noted that each of the bit identifiers, "0", "1", or "2" as discussed above, may identify either a RLE compression scheme, a RLE compression scheme with dictionary encode, or a compressionless scheme to be applied to a set of synaptic weights. The RLE compression scheme, the RLE compression scheme with dictionary encode, or the compressionless scheme may not be applied to the same set of synaptic weights simultaneously.

Turning now to FIGS. 5A-5D, respective graphs 70, 72, 74, and 76 illustrate comparisons of the hybrid compression scheme of the exemplary embodiments to related art compression schemes. For example, the exemplary hybrid compression scheme is compared to a fully compressionless scheme and an alternative approach that stores the address of destination neurons and the weights for valid synaptic connections (Neuron+WT). As seen in the illustrated graphs, the hybrid compression approach achieves a more compact memory size. FIGS. 5A-5D illustrate the memory required for different compression schemes for different synaptic weight precisions, and for connections with different synaptic sparsity. In the illustrated graphs, the sparsity varies from 0 to 0.9, or specifically, from 0 sparsity to 90% sparsity. The graphs also illustrate that the synaptic weight precision varies from 1 bit, 2 bits, 4 bits, and 8 bits. For a 1 bit synaptic weight, there is no clear advantage for compression schemes over compressionless approaches.

For a 2 bit synaptic weight, storage improvement may only be achieved for matrices with more than 70% sparsity.

Maximum savings (approximately 45%) over a compressionless approach was achieved for 90% sparsity. For 4 bit and higher synaptic weight, better improvement in memory size may be achieved. For example, maximum savings of approximately, 67% and 79% respectively for 4 bit and 8 bit synaptic weights.

The RLE compression approach consistently provided more compact memory size compared to the compressionless or Neuron+WT approach.

However, the hybrid compression approach of the exemplary embodiments achieves the highest degree of memory compactness, and avoids the overhead of compression bits for matrices with smaller sparsity.

Figure 6:
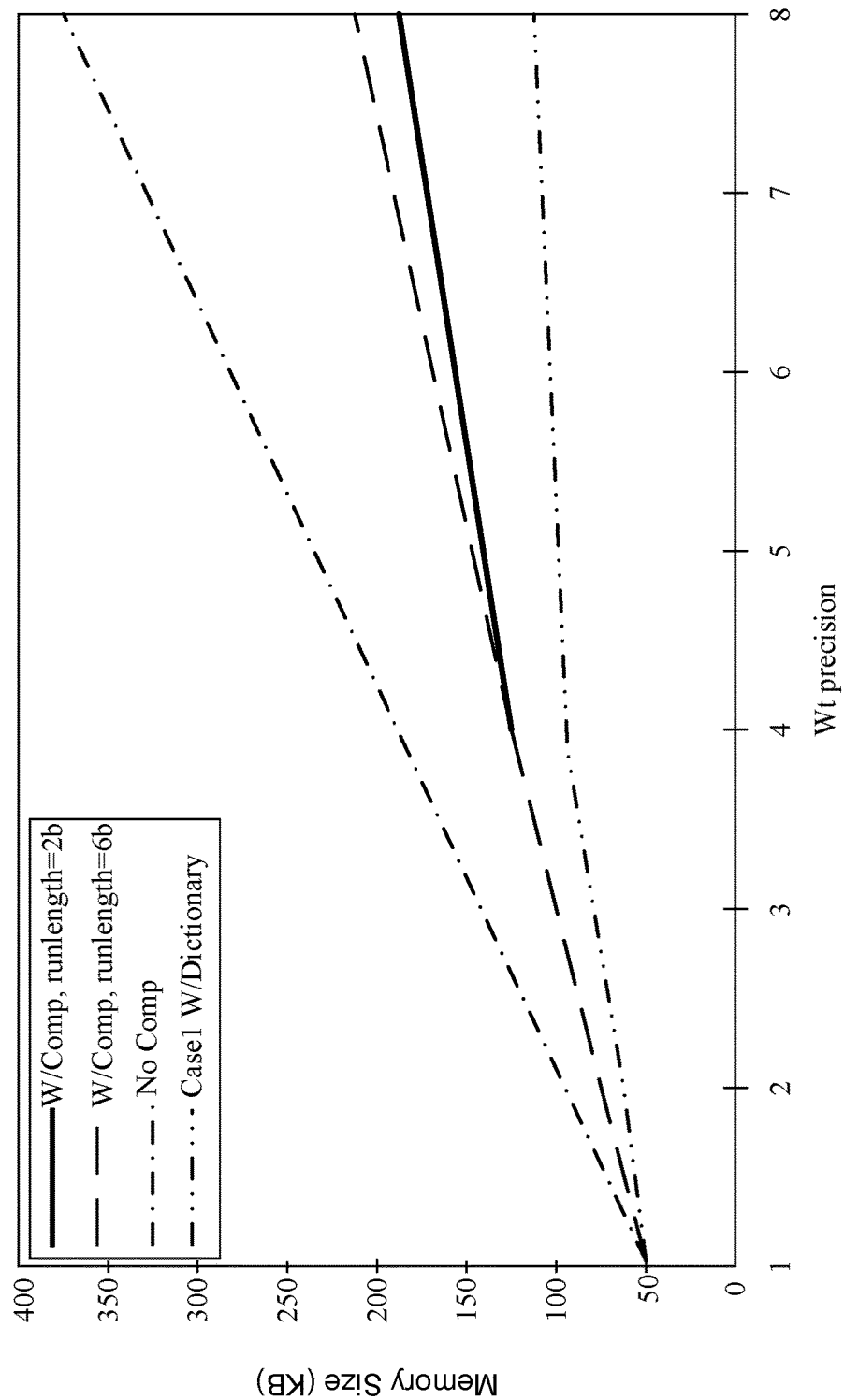
FIG. 6 illustrates another example of comparisons of related art compression approaches to the hybrid compression scheme of an exemplary embodiment.

Turning now to FIG. 6, it is illustrated that compression performance and memory savings, and thus compactness, may be further enhanced by using the dictionary encode approach. In the dictionary encode approach, the entire weight space may be quantized into 8 discrete values, which may be arbitrarily distributed in the weight space. The dictionary memory 30 (FIG. 2) stores these 8 discrete values, and the weight memory 28 (FIG. 2) stores a 3-bit pointer to the dictionary memory 30 (FIG. 2). The 8 discrete values is only exemplary, and other discrete values may be used.

Figure 7:
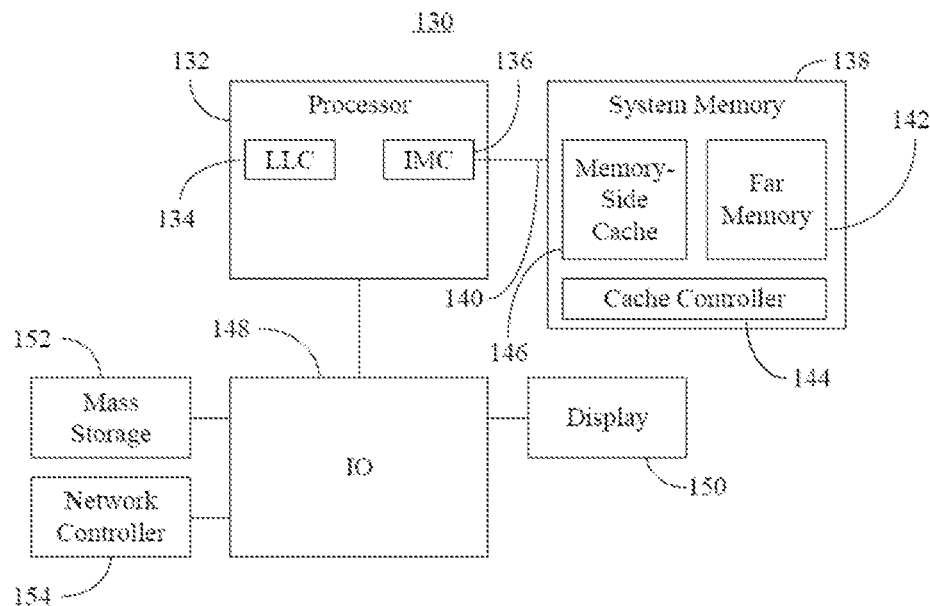
FIG. 7 is a block diagram of an example of a computing system according to an embodiment.

Turning now to FIG. 7, a memory-based computing system 130 is shown. The system 130 may generally be part of a server, desktop computer, notebook computer, tablet computer, convertible tablet, smart television (TV), personal digital assistant (PDA), mobile Internet device (MID), smart phone, wearable device, media player, etc., or any combination thereof. In the illustrated example, an input/output (IO) module 148 is communicatively coupled to a display 150 (e.g., liquid crystal display/LCD, light emitting diode/LED display, touch screen), mass storage 152 (e.g., hard disk drive/HDD, optical disk, solid state drive/SSD, flash memory) and a network controller 154 (e.g., wired, wireless). The illustrated system 130 may also include a host processor 132 (e.g., central processing unit/CPU) that includes a processor-side cache 134 (e.g., LLC) and an integrated memory controller 136 that communicates with a system memory 138 over a bus 140 or other suitable communication interface. The host processor 132 and the IO module 148 may be integrated onto a shared semiconductor die (not shown) in a system on chip (SoC) architecture.

Figure 8:
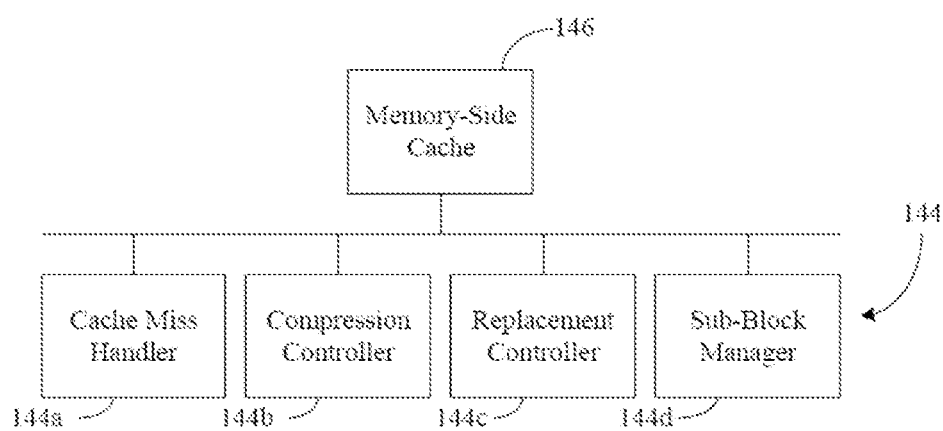
FIG. 8 is a block diagram of an example of a compression-enabled memory apparatus according to an embodiment.

With continuing reference to FIGS. 7 and 8, the system memory 138 may include a memory 142 (e.g., far memory that may be either volatile memory or non-volatile memory), a cache controller 144 (144a-144d) and a memory-side cache 146 that may be accessed more quickly than the memory 142. The memory-side cache 146 may be organized into a plurality of blocks (or sub-blocks). The illustrated cache controller 144 may generally implement one or more aspects of the method 60 (FIG. 4), already discussed. Thus, the cache controller 144 may function as a compression-enabled memory apparatus that includes a cache miss handler 144a to identify (e.g., in response to a cache miss) a first block, wherein the first block includes a first plurality of cache lines. For example, the first block might be retrieved and/or received from the far memory 142. Additionally, a compression controller 144b may be communicatively coupled to the cache miss handler 144a. The compression controller 144b may identify a second block that includes a second plurality of cache lines and resides in the memory-side cache 146. In one example, the compression controller 144b further compresses each cache line in the first plurality of cache lines with a corresponding cache line in the second plurality of cache lines to obtain a compressed block that includes a third plurality of cache lines.

In addition, a replacement controller 144c may be communicatively coupled to the cache miss handler 144a and the compression controller 144b, wherein the replacement controller 144c is configured to replace the second block in the memory-side cache 146 with the compressed block if the compressed block satisfies a size condition. The size condition may include, for example, each cache line in the third plurality of cache lines having a size that is less than or equal to a cache line size associated with the processor-side cache 134. The cache controller 144 may also include a sub-block manager 144d to partition the first block into sub-blocks that are larger than the cache line size. In such a case, the compression controller 144b may identify the second block on a sub-block basis.

In one example, the memory-side cache 146 may be referred to as "near memory" in a two level memory/2LM architecture. As already noted, the memory 142 may be far memory that includes either volatile memory or non-volatile memory. Non-volatile memory is a storage medium that does not require power to maintain the state of data stored by the medium. Non-limiting examples of non-volatile memory may include any or a combination of: solid state memory (such as planar or 3D NAND flash memory or NOR flash memory), 3D crosspoint memory, storage devices that use chalcogenide phase change material (e.g., chalcogenide glass), byte addressable non-volatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistorless stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices 106 that implement such standards may be referred to as DDR-based interfaces.

Additional Notes and Examples:

Example 1 may include a hybrid comprising a weight memory to store synaptic weights for synaptic connections, a pointer memory to store a plurality of prefix bits, each of the plurality of prefix bits identifying a type of compression to be performed on the synaptic weights stored in the weight memory, a dictionary memory, and a controller configured to perform a run-length encoding (RLE) compression on the synaptic weights stored in the weight memory based on a first prefix bit of the plurality of prefix bits, conduct a dictionary-based encode of commonly occurring synaptic weights that are within a predetermined weight value of each other based on a second prefix bit of the plurality of prefix bits, and conduct a compressionless storage of non-zero synaptic weights based on a third prefix bit of the plurality of prefix bits.

Example 2 may include the system of example 1, wherein each of the plurality of prefix bits are associated with a type of weight memory compression to be performed on the synaptic weights stored in the weight memory.

Example 3 may include the system of example 1, wherein performing the RLE compression further includes preceding non-zero synaptic weights by a first bit identifier, and preceding a length of zero value synaptic weights by a second bit identifier.

Example 4 may include the system of example 1, wherein conducting the compressionless storage includes storing non-zero synaptic weights without prefix bits.

Example 5 may include the system of example 1, wherein the dictionary-based encode includes storing a pointer in the weight memory that points to an entry in a dictionary memory.

Example 6 may include system of any one of examples 1 and 5, wherein the dictionary-based encode stores the commonly occurring synaptic weights that are within the predetermined weight value of each other into a look-up table.

Example 7 may include an apparatus to store synaptic weights in neuromorphic cores, the apparatus comprising a weight compressor to perform a run-length encoding (RLE) compression on the synaptic weights stored in a weight memory based on a first prefix bit of a plurality of prefix bits, an encoder communicatively coupled to the weight compressor, the encoder to conduct a dictionary-based encode of commonly occurring synaptic weights that are within a predetermined weight value of each other based on a second prefix bit of the plurality of prefix bits, and a storage interface communicatively coupled to the encoder, the storage interface to conduct a compressionless storage of non-zero synaptic weights based on a third prefix bit of the plurality of prefix bits.

Example 8 may include the apparatus of example 7, wherein each of a plurality of prefix bits stored in a pointer memory are to be associated with a type of weight memory compression to be performed on the synaptic weights stored in the weight memory.

Example 9 may include the apparatus of example 7, wherein the RLE compression precedes non-zero synaptic weights by a first bit identifier and precedes a length of zero value synaptic weights by a second bit identifier.

Example 10 may include the apparatus of example 7, wherein the compressionless storage stores non-zero synaptic weights without prefix bits.

Example 11 may include the apparatus of example 7, wherein the dictionary-based encode stores a pointer in the weight memory that points to an entry in a dictionary memory.

Example 12 may include the apparatus of any one of examples 7 and 11, wherein the dictionary-based encode stores the commonly occurring synaptic weights that are within the predetermined weight value of each other into a look-up table.

Example 13 may include a method to store synaptic weights in neuromorphic cores, the method comprising performing a run-length encoding (RLE) compression on synaptic weights stored in a weight memory based on a first prefix bit of a plurality of prefix bits, conducting a dictionary-based encode of commonly occurring synaptic weights that are within a predetermined weight value of each other based on a second prefix bit of the plurality of prefix bits, and conducting a compressionless storage of non-zero synaptic weights based on a third prefix bit of the plurality of prefix bits.

Example 14 may include the method of example 13, further comprising storing the plurality of prefix bits in a pointer memory, and associating each of the plurality of prefix bits with a type of weight memory compression to be performed on the synaptic weights stored in the weight memory.

Example 15 may include the method of example 13, wherein performing the RLE compression further includes preceding non-zero synaptic weights by a first bit identifier, and preceding a length of zero value synaptic weights by a second bit identifier.

Example 16 may include the method of example 13, wherein conducting the compressionless storage includes storing non-zero synaptic weights without prefix bits.

Example 17 may include the method of example 13, wherein conducting the dictionary-based encoding includes storing a pointer in the weight memory that points to an entry in a dictionary memory.

Example 18 may include the method of any one of examples 13 and 17, wherein the dictionary-based encoding stores the commonly occurring synaptic weights that are within the predetermined weight value of each other into a look-up table.

Example 19 may include at least one computer readable storage medium comprising a set of instructions, which when executed by an apparatus, cause an apparatus to perform a run-length encoding (RLE) compression on synaptic weights stored in a weight memory based on a first prefix bit of a plurality of prefix bits, conduct a dictionary-based encoding of commonly occurring synaptic weights that are within a predetermined weight value of each other based on a second prefix bit of the plurality of prefix bits, and conduct a compressionless storage of non-zero synaptic weights based on a third prefix bit of the plurality of prefix bits.

Example 20 may include the at least one computer readable storage medium of example 19, further comprising storing the plurality of prefix bits in a pointer memory, and associating each of the plurality of prefix bits with a type of weight memory compression to be performed on the synaptic weights stored in the weight memory.

Example 21 may include the at least one computer readable storage medium of example 19, wherein performing the RLE compression further includes preceding non-zero synaptic weights by a first bit identifier, and preceding a length of zero value synaptic weights by a second bit identifier.

Example 22 may include the at least one computer readable storage medium of example 19, wherein conducting the compressionless storage includes storing non-zero synaptic weights without prefix bits.

Example 23 may include the at least one computer readable storage medium of example 19, wherein conducting the dictionary-based encoding includes storing a pointer in the weight memory that points to an entry in a dictionary memory.

Example 24 may include at least one computer readable storage medium of any one of examples 19 and 23, wherein the dictionary-based encoding stores the commonly occurring synaptic weights that are within the predetermined weight value of each other into a look-up table.

Example 25 may include an apparatus to store synaptic weights in neuromorphic cores, the apparatus comprising means for performing a run-length encoding (RLE) compression on synaptic weights stored in a weight memory based on a first prefix bit of a plurality of prefix bits, means for conducting a dictionary-based encode of commonly occurring synaptic weights that are within a predetermined weight value of each other based on a second prefix bit of the plurality of prefix bits, and means for conducting a compressionless storage of non-zero synaptic weights based on a third prefix bit of the plurality of prefix bits.

Example 26 may include the apparatus of example 25, further comprising means for storing the plurality of prefix bits in a pointer memory, and associating each of the plurality of prefix bits with a type of weight memory compression to be performed on the synaptic weights stored in the weight memory.

Example 27 may include the apparatus of example 26, wherein performing the RLE compression further includes means for preceding non-zero synaptic weights by a first bit identifier, and means for preceding a length of zero value synaptic weights by a second bit identifier.

Example 28 may include the apparatus of example 25, wherein conducting the compressionless storage includes means for storing non-zero synaptic weights without prefix bits.

Example 29 may include the apparatus of example 25, wherein conducting the dictionary-based encoding includes means for storing a pointer in the weight memory that points to an entry in a dictionary memory.

Example 30 may include the apparatus of any one of examples 25 and 29, wherein the dictionary-based encoding is to store the commonly occurring synaptic weights that are within the predetermined weight value of each other into a look-up table.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A neuromorphic system comprising:
    a weight memory to store synaptic weights for synaptic connections;
    a pointer memory to store a plurality of prefix bits, each of the plurality of prefix bits identifying a type of compression to be performed on the synaptic weights stored in the weight memory;
    a dictionary memory; and
    a controller configured to:
        perform a run-length encoding (RLE) compression on the synaptic weights stored in the weight memory based on a first prefix bit of the plurality of prefix bits;
        conduct a dictionary-based encode of commonly occurring synaptic weights that are within a predetermined weight value of each other based on a second prefix bit of the plurality of prefix bits; and
        conduct a compressionless storage of non-zero synaptic weights based on a third prefix bit of the plurality of prefix bits.

2. The system of claim 1, wherein each of the plurality of prefix bits are associated with a type of weight memory compression to be performed on the synaptic weights stored in the weight memory.

3. The system of claim 1 wherein performing the RLE compression further includes:
    preceding non-zero synaptic weights by a first bit identifier; and preceding a length of zero value synaptic weights by a second bit identifier.

4. The system of claim 1, wherein conducting the compressionless storage includes storing non-zero synaptic weights without prefix bits.

5. The system of claim 1, wherein the dictionary-based encode includes storing a pointer in the weight memory that points to an entry in a dictionary memory.

6. The system of claim 1, wherein the dictionary-based encode stores the commonly occurring synaptic weights that are within the predetermined weight value of each other into a look-up table.

7. An apparatus comprising:
a weight compressor to perform a run-length encoding (RLE) compression on the synaptic weights stored in a weight memory based on a first prefix bit of a plurality of prefix bits;
an encoder communicatively coupled to the weight compressor, the encoder to conduct a dictionary-based encode of commonly occurring synaptic weights that are within a predetermined weight value of each other based on a second prefix bit of the plurality of prefix bits; and
a storage interface communicatively coupled to the encoder, the storage interface to conduct a compressionless storage of non-zero synaptic weights based on a third prefix bit of the plurality of prefix bits.

8. The apparatus of claim 7, wherein each of a plurality of prefix bits stored in a pointer memory are to be associated with a type of weight memory compression to be performed on the synaptic weights stored in the weight memory.

9. The apparatus of claim 7, wherein the RLE compression precedes non-zero synaptic weights by a first bit identifier and precedes a length of zero value synaptic weights by a second bit identifier.

10. The apparatus of claim 7, wherein the compressionless storage stores non-zero synaptic weights without prefix bits.

11. The apparatus of claim 7, wherein the dictionary-based encode stores a pointer in the weight memory that points to an entry in a dictionary memory.

12. The apparatus of claim 7, wherein the dictionary-based encode stores the commonly occurring synaptic weights that are within the predetermined weight value of each other into a look-up table.

13. A method comprising:
performing a run-length encoding (RLE) compression on synaptic weights stored in a weight memory based on a first prefix bit of a plurality of prefix bits;
conducting a dictionary-based encode of commonly occurring synaptic weights that are within a predetermined weight value of each other based on a second prefix bit of the plurality of prefix bits; and
conducting a compressionless storage of non-zero synaptic weights based on a third prefix bit of the plurality of prefix bits.

14. The method of claim 13, further comprising storing the plurality of prefix bits in a pointer memory, and associating each of the plurality of prefix bits with a type of weight memory compression to be performed on the synaptic weights stored in the weight memory.

15. The method of claim 13, wherein performing the RLE compression further includes:
preceding non-zero synaptic weights by a first bit identifier; and
preceding a length of zero value synaptic weights by a second bit identifier.

16. The method of claim 13, wherein conducting the compressionless storage includes storing non-zero synaptic weights without prefix bits.

17. The method of claim 13, wherein conducting the dictionary-based encoding includes storing a pointer in the weight memory that points to an entry in a dictionary memory.

18. The method of claim 13, wherein the dictionary-based encoding stores the commonly occurring synaptic weights that are within the predetermined weight value of each other into a look-up table.

19. At least one non-transitory computer readable storage medium comprising a set of instructions, which when executed by an apparatus, cause an apparatus to: perform a run-length encoding (RLE) compression on synaptic weights stored in a weight memory based on a first prefix bit of a plurality of prefix bits; conduct a dictionary-based encoding of commonly occurring synaptic weights that are within a predetermined weight value of each other based on a second prefix bit of the plurality of prefix bits; and conduct a compressionless storage of non-zero synaptic weights based on a third prefix bit of the plurality of prefix bits.

20. The at least one non-transitory computer readable storage medium of claim 19, further comprising storing the plurality of prefix bits in a pointer memory, and associating each of the plurality of prefix bits with a type of weight memory compression to be performed on the synaptic weights stored in the weight memory.

21. The at least one non-transitory computer readable storage medium of claim 19, wherein performing the RLE compression further includes: preceding non-zero synaptic weights by a first bit identifier; and preceding a length of zero value synaptic weights by a second bit identifier.

22. The at least one non-transitory computer readable storage medium of claim 19, wherein conducting the compressionless storage includes storing non-zero synaptic weights without prefix bits.

23. The at least one non-transitory computer readable storage medium of claim 19, wherein conducting the dictionary-based encoding includes storing a pointer in the weight memory that points to an entry in a dictionary memory.

24. The at least one non-transitory computer readable storage medium of claim 19, wherein the dictionary-based encoding stores the commonly occurring synaptic weights that are within the predetermined weight value of each other into a look-up table.

* * * * *